FIG. I
FLOW SHEET

Keiichi Murakami,
Mitsuo Hanada
and
Hidehiko Miyairi
INVENTORS

United States Patent Office 3,375,066
Patented Mar. 26, 1968

3,375,066
PROCESS FOR THE CONTINUOUS PRODUCTION OF GYPSUM AND IRON OXIDE FROM WASTE SULFURIC ACID PICKLE LIQUOR AND A CALCIUM COMPOUND
Keiichi Murakami, Sendai, and Mitsuo Hanada and Hidehiko Miyairi, Kitakyushu, Japan, assignors to Yawata Chemical Industry Co., Ltd., Tokyo, Japan, a corporation of Japan
Filed Aug. 19, 1964, Ser. No. 390,675
Claims priority, application Japan, Aug. 24, 1963, 38/44,835 and 38/44,836
9 Claims. (Cl. 23—122)

ABSTRACT OF THE DISCLOSURE

This invention relates to a method for the continuous production of gypsum from a waste sulfuric acid pickle liquor containing iron comprising introducing into a reaction vessel said liquor, a slurry of a compound such as calcium carbonate or calcium hydroxide and water in such amounts that pH of the mixture is less than 2.5 and the concentration of $CaSO_4 \cdot 2H_2O$ in the mixture is 100 to 300 g./l., stirring the mixture to accelerate the formation of product gypsum of 100 to 200 microns in grain size and separating the reaction mixture into product gypsum and fine gypsum of less than 100 microns.

---

This invention relates to a process for the continuous production of gypsum and iron oxide from a waste sulfuric acid pickle liquor containing iron.

As a typical example of a waste sulfuric acid pickle liquor containing iron, there may be mentioned a waste acid solution discharged from sulfuric acid pickling in the steps for treating and processing iron and steel materials. Hitherto such a waste acid solution has usually been drained as it is, which causes public-hygienical problems. Therefore, various processes have been tried for the treatment or disposal of such a waste acid pickle liquor.

As one of these processes, it is known to obtain gypsum from a waste sulfuric acid pickle liquor by adding calcium hydroxide to the sulfuric acid solution to neutralize the latter thereby. However, this method is accompanied by drawbacks in that gelled iron hydroxide is deposited and at the same time fine gypsum crystals of about 2 to 3 microns are produced. This makes the separation of the fine gypsum from the iron hydroxide impossible and the filtering and drying very difficult.

Thus, it is considered that the attempt for recovering good qualified gypsum from the waste sulfuric acid pickle liquor has not been practiced in industry.

As the results of detailed investigation the inventors have found a process for the continuous recovery of gypsum containing substantially no iron compounds and having the property of good filterability from a waste sulfuric acid pickle liquor containing iron sulfate. The process involves treating the waste sulfuric acid pickle liquor with a calcium source under specific conditions.

The object of the present invention is to provide a method of effectively recovering gypsum from a waste sulfuric acid pickle liquor by treating the sulfuric acid with a calcium source.

Another object of the present invention is to provide a method of effectively recovering iron oxide from a waste sulfuric acid pickle liquor by treating the sulfuric acid with a calcium source.

As previously indicated, as the waste sulfuric acid pickle liquor containing iron to be treated by the process of this invention, there may be mentioned for example, a waste acid discharged from a pickling process for iron and steel materials. It is preferable in this invention that the sulfuric acid solution contain about 6 grams per liter (g./l.) of free sulfuric acid.

As the calcium source for employment in this invention, calcium carbonate, calcium hydroxide, or a mixture thereof may be used. As the calcium carbonate there may be used limestone as well as a by-product of caustification or a dust in a cement kiln which has hitherto fallen into resue. As the calcium hydroxide there may be used slaked lime or a carbide slag which has hitherto fallen into reuse.

The main features of the present invention reside in that in adding a calcium source, that is, calcium carbonate or calcium hydroxide, to a waste sulfuric acid pickle liquor, a neutralization should be avoided. More concretely, the formation of iron hydroxide should be prevented, and gypsum crystals of large size should be produced. In order to realize the above mentioned features the specific conditions of adding the calcium source to the waste sulfuric acid pickle liquor should be maintained. The specific conditions are that the pH value of the resulting mixture should be regulated to a certain value below the neutral point and the concentration of the resulting $CaSO_4 \cdot 2H_2O$ regulated to a certain range of value.

The greatest yields of gypsum produce are obtained when calcium source, that is, one of the components selected from a group consisting of calcium carbonate, calcium carbonate, calcium hydroxide or a mixture of them, in the form of slurry and water, is added to a waste sulfuric acid pickle liquor containing iron in a reaction bath in an amount so that the pH value of the resulting mixture is less than about 2.5 and the concentration of $CaSO_4 \cdot 2H_2O$ in the mixture is about 100 to 300 g./l. when the pH exceeds this value, iron hydroxide of a greater percentage will be formed, and when the concentration of $CaSO_4 \cdot 2H_2O$ exceeds the above range the formation of fine gypsum crystals will increase. When operating at values less than these, the operation will be uneconomical.

In the practical production of gypsum product having a crystal length of 100 to 200 microns on an industrial scale, the fine gypsum crystals of less than 100 microns, mostly of 2 to 3 microns, are to be added as seed crystal together with a calcium source slurry or in advance depending upon conditions. By using seed crystals of fine grain in the production of gypsum product is accelerated, as they grow into product gypsum in the reaction bath.

Therefore, in the method according to the present invention, calcium source slurry, water and seed crystal are added to the waste sulfuric acid pickle liquor containing iron in the reaction bath in amounts so that the pH of the resulting mixture may be less than 2.5 and the concentration of $CaSO_4 \cdot 2H_2O$ in the reaction mixture may be 100 to 300 g./l. The reaction proceeds in the reaction bath, while the mixture solution is stirred by an agitator equipped to said reaction bath for 1.5 to 5 hours, whereby gypsum product and fine gypsum are produced, which are further easily separated from the mixture solution by a separator.

A yield as high as 95 wt. percent of product gypsum may be obtained and the fine gypsum may be recyclically used as the seed crystal. The amount of the seed crystal to be circulated is influenced by the concentration of the reaction liquid, surface area of the crystal nucleus, pH value, extent of agitation, etc., but this amount may be fixed under the constant operating conditions. In general, the amount of the seed crystal to be added will take about 5% of the concentration of $CaSO_4 \cdot 2H_2O$ resulting from the reaction in the reaction bath, that is, 100 to 300 g./l. Among the operating conditions specified in the present invention, the pH in the reaction bath is adjusted to a value less than about 2.5, preferably, to 0.5 to 2 and the concentration of $CaSO_4 \cdot 2H_2O$ is adjusted to about 100 to 300 g./l. These values can be achieved by adjusting the amounts of the calcium source slurry and the seed crystal added.

Also the reaction temperature in the reaction bath, stirring operation and the retention time of the reaction mixture in the reaction bath exert influences on accelerating the formation of the product gypsum. The temperature in the reaction bath is preferably higher, but it is not necessary to especially heat the reaction mixture. The average retention time of the reaction mixture in the reaction bath is preferably 1.5 to 5 hours.

The reaction mixture discharged from the reaction bath is separated into product gypsum, fine crystal gypsum and remaining liquid by means of separators, such as, a liquid cyclone and a thickener. The obtained fine gypsum may be recycled into the reaction bath as the seed crystal as above mentioned, and the remaining liquor which contains less than 5% free sulfuric acid, the rest being iron sulfate, may be subjected to a further treatment for recovering product gypsum and iron oxide therefrom.

Thus, the deposition of iron hydroxide can be completely prevented by the above operation conditions of this invention and gypsum containing no iron salts can be continuously produced. Also the growth of crystalline gypsum is promoted to give product gypsum of above 100 microns in size.

Moreover, since iron hydroxide is not deposited and also the concentration of gypsum in the reaction bath is adjusted, the reaction liquid in the reaction bath can be treated very easily in agitation and product gypsum and fine crystal gypsum can be separated easily in the separation process by means of a simple separator.

Thus separated product gypsum has the C-axis of crystal of about 100 to 200 microns in length and is a tubular crystal of a comparatively uniform thickness. The water content can be reduced to about 10% by means of a centrifugal separator.

The product gypsum obtained in this invention has a good quality not inferior to natural gypsum, and can be used as gypsum for cement, plaster, or mold.

In view of the fact that the process of this invention is simple in operation and a waste sulfuric acid pickle liquor which has not been utilized hitherto can be used, and further since cement kiln dust or carbide slag and the like which also have not been utilized can be used as the calcium source, thereby reducing extremely the cost for the raw materials, the industrial merit of this invention is very high.

The present invention is further characterized by recovering product gypsum and iron oxide from the remaining liquor obtained after product gypsum and fine gypsum have been removed from the reaction mixture discharged from the reaction bath. For this purpose a secondary bath is used, which is installed by the side of said reaction bath (hereafter designated as the primary bath).

In the secondary reaction bath calcium hydroxide slurry (in the second bath only calcium hydroxide is used), water and seed crystal are added the remaining liquor from the primary bath in such amounts that the pH of the resulting mixture is 6 to 10 and the concentration of $Fe(OH)_2$ is 10 to 30 g./l.

The temperature in the secondary reaction bath is heated to 50 to 100° C. by, e.g., steam, and the secondary reaction bath is maintained in an oxidizing atmosphere by blowing air into the reaction bath.

The average retention time for the reaction mixture is preferably about 1 to 3 hours and the reaction mixture in the secondary reaction bath must be also agitated continuously by equipping the apparatus with an agitator.

The reaction mixture from the secondary reaction bath is separated into product gypsum, fine crystal gypsum, iron oxide and waste liquor by means of separators, such as, a liquid cyclone, a thickener and a centrifugal separator. The fine crystal gypsum may be also recycled into the secondary reaction bath as the seed crystal and the waste liquor may be reused.

The yield of product gypsum may also amount to 95 wt. percent.

Thus, in combining the primary and secondary reaction baths the operating conditions according to the method of the present invention may be summarized as follows:

In the first primary reaction bath calcium source slurry selected from a group consisting of calcium carbonate, calcium hydroxide or a mixture of them, water and seed crystal are added into a waste sulfuric acid pickle liquor in amounts such that the pH of the resulting mixture is less than 2.5 and the concentration of $CaSO_4 \cdot 2H_2O$ in the mixture is 100 to 300 g./l. (Here it is to be noted that the case of not adding seed crystal the process is also operable.) The reaction is caused to proceed while stirring the mixture for 1.5 to 5 hours but without heating the same. The reaction mixture is discharged from the bath and is separated into product gypsum, fine gypsum and remaining liquor. While the product gypsum is recovered, the fine gypsum is used as seed crystal in the primary and/or secondary bath, and the remaining liquor is sent to the secondary reaction bath. In this bath calcium hydroxide slurry, water and seed crystal are added to said remaining liquor obtained from the primary bath in such amounts that the pH of the mixture is 6 to 10 and the concentration of $Fe(OH)_2$ is 10 to 30 g./l. The reaction is caused to proceed while heating the mixture to from 50 to 100° C. and while stirring the same for 1 to 3 hours. The atmosphere is maintained as an oxidizing atmosphere by blowing air into the reaction bath. The reaction product is separatted into product gypsum, fine gypsum and iron oxide. Thus, the product gypsum and iron oxide are recovered and the fine gypsum may be used as seed crystal in the second reaction bath.

It is also possible to use the remaining liquor obtained from the primary bath, which contains fine gypsum, in the secondary bath. The introduction of a waste sulfuric acid pickle liquor and calcium source slurry in the primary reaction bath or that of the remaining liquor and a calcium source slurry in the secondary reaction bath is carried out with a certain flow rate per unit time.

The process of this invention will further be explained in detail referring to the accompanying drawings in which.

In FIGS. 2, 3, 4 and 5 one graduation on the scale indicates 16 microns.

Figure 1:
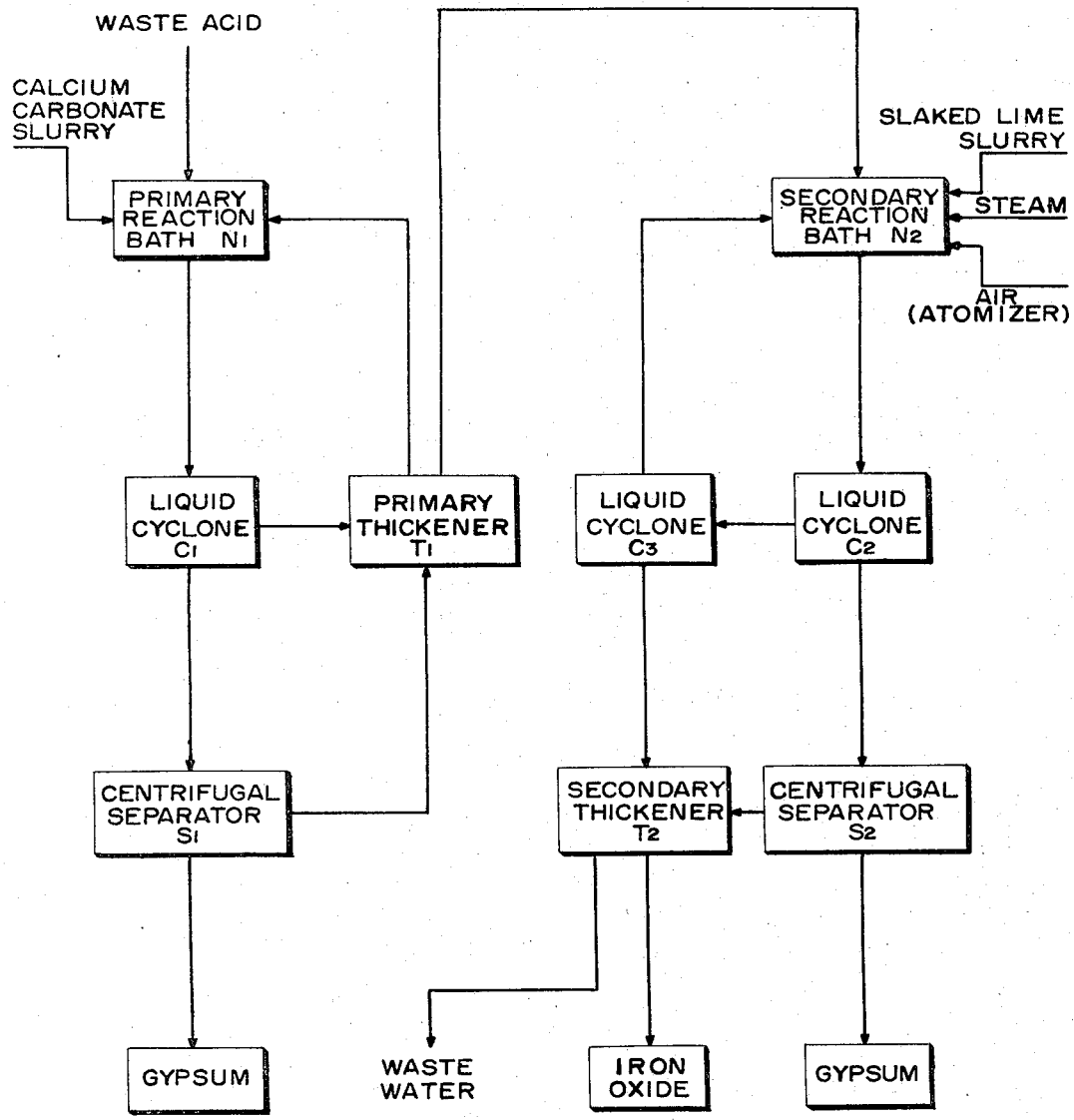
FIG. 1 is a flow sheet of an embodiment of the process of this invention.

In the flow sheet shown in FIG. 1, a sulfuric acid pickle liquor containing iron, a calcium source slurry and a seed crystal are continuously introduced into a primary reaction bath ($N_1$). The reaction liquid withdrawn from the bath ($N_1$) is introduced into a liquid cyclone ($C_1$) and the bottom liquid from the cyclone ($C_1$) is then introduced into a centrifugal separator ($S_1$) where it is separated into product gypsum and a filtrate. The filtrate is introduced together with an over-flow liquid from the cyclone ($C_1$) into a thickener ($T_1$). The bottom concentrate (containing fine crystal gypsum) is recycled to the primary reaction bath ($N_1$) as the seed crystal and the upper liquid from the thickener ($T_1$) is then introduced into a secondary reaction bath ($N_2$) having an agitator.

Into the secondary reaction bath ($N_2$) are introduced a calcium source slurry, a seed crystal, air and steam for heating together with the upper liquid from the thickener ($T_1$). The reaction liquid from the secondary bath ($N_2$) is introduced into a liquid cyclone ($C_2$) wherein it is separated into a bottom liquid and an over-flow liquid. The bottom liquid is separated into product gypsum and a filtrate in a centrifugal separator ($S_2$). The overflow liquid is introduced into a liquid cyclone ($C_3$) and the bottom concentrate (containing fine crystal gypsum) is recycled into the secondary reaction bath ($N_2$) as the seed crystal. The over-flow liquid from the liquid cyclone ($C_3$) and the filtrate from the centrifugal separator ($S_2$) are introduced into a thickener ($T_2$) wherein the mixture is separated into a bottom layer consisting of iron oxide and a waste upper liquid.

The advantages obtained by the present invention in the primary and secondary reaction baths may be summarized as follows:

(1) As the deposition of iron oxide in the primary reaction bath is prevented completely by such procedural conditions, gypsum containing no iron compounds can be continuously produced and also the growth of the gypsum crystal is promoted so that gypsum larger than 100 microns can be obtained. Thus, the high yield of 95 wt. percent may be obtained.

(2) As the iron oxide is not deposited and the concentration of gypsum is adjusted in the primary reaction bath, the reaction mixture in the bath can be treated very easily in agitation and product gypsum and fine crystal gypsum can be easily separated by a simple separator.

(3) Thus obtained product gypsum has a C axis of crystal of about 100 to 200 microns in length and is a tabular crystal having a uniform thickness, and also the water content can be reduced to about 10% by means of a centrifugal separator.

(4) In the secondary reaction bath, iron oxide is deposited simultaneously with gypsum, but as the iron oxide in this step is a crystalline oxide having a good precipitating property caused by adjusting the concentration of the iron oxide in the reaction mixture in the secondary reaction bath, heating the reaction system, and maintaining the reaction bath to an oxidizing atmosphere, the reaction mixture can be also treated very easily in agitation, and product gypsum, iron oxide and fine crystal gypsum can be easily separated in the separation step by means of a simple separator. Thus obtained product gypsum contains only an extremely small amount of iron oxide and a tabular crystal having above 100 microns in length and a uniform thickness. Further, the iron oxide is black and has magnetism, and considered to be $FeO \cdot Fe_2O_3 \cdot nH_2O$.

(5) The gypsum obtained by this invention, in particular, the gypsum obtained from the primary reaction bath is good in quality and can be used as gypsum for cement, plaster, or molds. Also, the iron oxide can be used as raw materials for cement clinker, iron manufacturing, and catalysts.

(6) The process of this invention is, as mentioned above in detail, simple in operation and also by the process of this invention, a waste sulfuric acid pickle liquor which has not been hitherto utilized can be used as the raw material as well as mud slag, cement kiln dust, or carbide slag, etc., which also has not been utilized, can be used as the calcium source, which reduces extremely the cost for the raw materials. Therefore, this invention has very useful industrial advantages.

For these reasons, by this invention, a process for recovering high-grade gypsum and iron oxide from a sulfuric acid pickle liquor containing iron, the industrial practice for said process having been hitherto impossible, is accomplished industrially by defining a comparatively simple procedural condition.

The invention will be further explained more practically by the following examples.

EXAMPLE 1

Into a primary reaction bath of 0.3 cubic meter ($m.^3$) in volume having an agitator were continuously introduced 1,000 milliliters per minute (ml./min.) of a sulfuric acid pickle liquor containing 160 g./l. of $H_2SO_4$ and 160 g./l. of $FeSO_4$ and 670 ml./min. of a calcium carbonate containing 220 g./l. of $CaCO_3$. 200 grams (g.) of fine crystal gypsum was beforehand added in the primary reaction bath and the amount of gypsum in the bath was maintained to 160 g./l. (as $CaSO_4 \cdot 2H_2O$). The pH of the reaction liquid in the bath was maintained to 1.0 to 1.3 and the temperature to 25 to 30° C.

After stirring the reaction mixture in the bath for about 3 hours, the reaction mixture was sent to a centrifugal separator at a rate of 1,670 ml./l. Gypsum was separated at a rate of 230 gl./min. and the gypsum contained 12% water. The gypsum was a tabular crystal of about 140 x 20 microns, a copy of the microphotograph of which was shown in FIG. 3.

From the centrifugal separator was obtained 1,500 ml./min. of a filtrate containing 5.1 g./l. of $H_2SO_4$ and 102 g./l. of $FeSO_4$.

EXAMPLE 2

Into the secondary reaction bath of 0.6 $m.^3$ in volume having an agitator were introduced continously 1,500 ml./min. of the filtrate obtained in Example 1, 4,600 ml./min. of a slaked lime slurry containing 17.8 g./l. of $Ca(OH)_2$, and 30 g./min. of fine crystal gypsum obtained from a secondary liquid cyclone mentioned below. The reaction mixture in the secondary reaction bath was heated to 80 to 85° C. by steam and 130 l./min. of air was blown into the bath from an atomizer. The pH of the reaction mixture in the bath was 7 to 8 and the concentration of $Fe(OH)_2$ was 15 g./l. and the concentration of gypsum (as $CaSO_4 \cdot 2H_2O$) was 35 g./l.

After stirring the reaction mixture in the secondary reaction bath for an average retention time of 1.5 hrs., 6,200 ml./min. of reaction liquid was introduced into a primary liquid cyclone to be separated into 620 ml./min. of a bottom stream and 5,600 ml./min. of an over-flow stream. By sending the bottom stream to a centrifugal separator, 160 g./min. of product gypsum was obtained. The gypsum was a tabular crystal of 200 x 9 microns and contained about 11% water and about 5% iron oxide.

The over-flow stream from the primary liquid cyclone was introduced into a secondary liquid cyclone wherein it is separated into 560 ml./min. of a bottom stream and 5,000 ml./min. of an over-flow stream. The bottom stream contained fine crystal gypsum and was recycled as the seed crystal.

The over-flow stream from the secondary liquid cyclone was sent to a thickener and separated into iron oxide (90 g./min.) and waste water.

The thus obtained waste water showed the following chemical and physical properties:

Contents:
    Ignition residual _____p.p.m__ 1,780
    $SO_4$ ion _____p.p.m__ 81.0
    Total Fe ion _____p.p.m__ 0.05
    Free sulfuric acid _____p.p.m__ 0.0
pH _____ 8
Colour, colourless and transparent.
Temperature, ° C. _____ 27.7
Turbidity _____ 3

Figure 2:
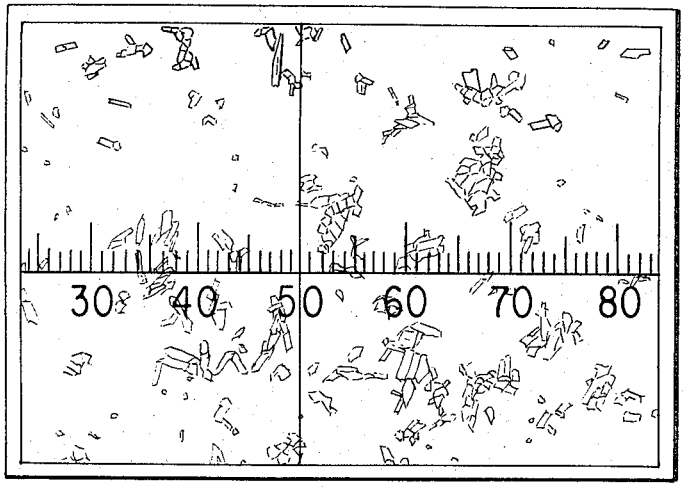
FIG. 2 is a copy of a microphotograph of a seed crystal of gypsum used in this invention.
Figure 3:
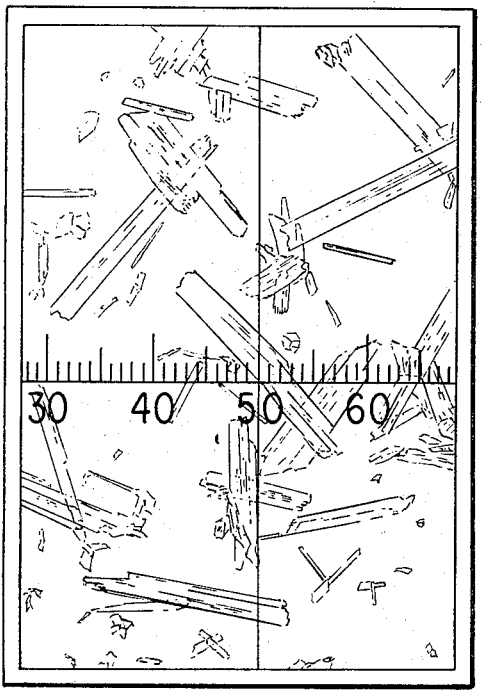
FIG. 3 is a copy of a microphotograph of product gypsum obtained from the primary reaction bath in this invention.
Figure 4:
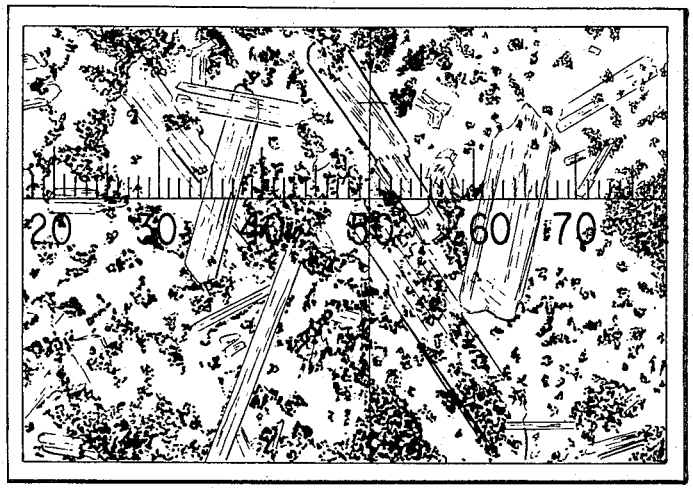
FIG. 4 is a copy of a microphotograph of a mixture, prior to separation, of gypsum and iron oxide obtained from the secondary reaction bath in this invention.
Figure 5:
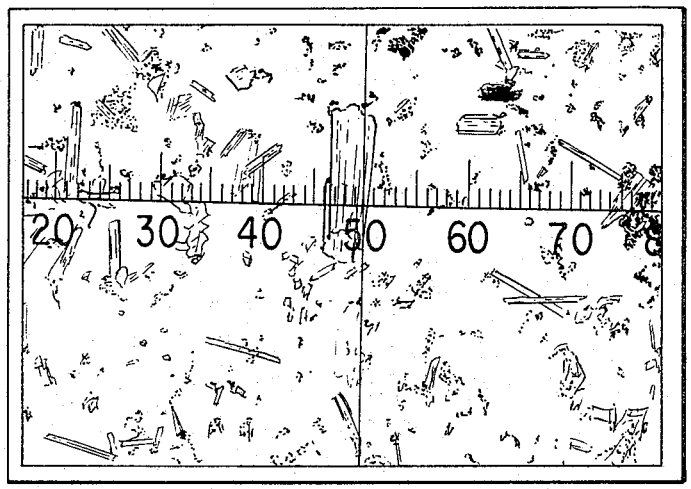
FIG. 5 is a copy of a microphotograph showing the gypsum and the iron oxide of the mixture in FIG. 4 after separation.

The copies of the microphotographs of the seed crystal to be recycled, the reaction mixture from the secondary reaction bath, product gypsum separated by the primary liquid cyclone and iron oxide separated by the thickener were shown in FIG. 2, FIG. 4 and FIG. 5, respectively.

What is claimed is:

1. A process for the continuous production of gypsum from a waste sulfuric acid pickle liquor which comprises
(1) introducing into a reaction vessel said waste sulfuric acid pickle liquor, a slurry of a component selected from the group consisting of calcium carbonate, calcium hydroxide and mixtures thereof and water in such amounts that the pH of the resulting mixture is less than 2.5 and the concentration of $CaSO_4 \cdot 2H_2O$ in the mixture is from 100 to 300 g./l., (2) stirring said mixture for 1.5 to 5 hours to accelerate the formation of product gypsum of 100 to 200 microns in grain size, (3) separating the resulting reaction mixture discharge from said reaction bath into product gypsum, fine gypsum of less than 100 microns in grain size and remaining liquor by means of a separator, and (4) recovering the product gypsum therefrom.

2. A process for the continuous production of gypsum from a waste sulfuric acid pickle liquor which comprises (1) introducing into a reaction vessel said waste sulfuric acid pickle liquor, a slurry of a component selected from the group consisting of calcium carbonate, calcium hydroxide, and mixtures thereof, water and seed crystal in such amounts that the pH of the mixture is less than 2.5 and the concentration of $CaSO_4 \cdot 2H_2O$ in the mixture is from 100 to 300 g./l., the amount of said seed crystal added corresponding to about 5% of the concentration of $CaSO_4 \cdot 2H_2O$, (2) stirring said mixture for 1.5 to 5 hours to accelerate the formation of product gypsum of 100 to 200 microns in grain size, (3) separating the resulting reaction mixture discharged from said reaction bath into product gypsum, fine gypsum of less than 100 microns in grain size and remaining liquor by means of a separator, and (4) recovering the product gypsum therefrom.

3. A process as in claim 1 wherein a slurry of a mixture of calcium carbonate and calcium hydroxide is added to the waste sulfuric acid pickle liquor.

4. A process as in claim 2 wherein a slurry of a mixture of calcium carbonate and calcium hydroxide is added to the waste sulfuric acid pickle liquor.

5. A process as in claim 2 wherein a fine gypsum of less than 100 microns in grain size obtained from the reaction mixture discharged from the reaction vessel by a separator is used as the seed crystal to be added in the reaction vessel.

6. A process as in claim 3 wherein fine gypsum of less than 100 microns in grain size obtained from the reaction mixture discharged from the reaction bath by a separator is used as the seed crystal to be added in the reaction bath.

7. A process for the continuous production of gypsum and iron oxide from a waste sulfuric acid pickle liquor which comprises (1) introducing into a primary reaction vessel said waste sulfuric acid pickle liquor, a slurry of a component selected from the group consisting of calcium carbonate, calcium hydroxide and mixtures thereof, water and seed crystal in such amounts that the pH of the mixture is less than 2.5 and the concentration of $CaSO_4 \cdot 2H_2O$ in the mixture is from 100 to 300 g./l., the amount of said seed crystal to be added corresponding to about 5% of said concentration of $CaSO_4 \cdot 2H_2O$, (2) stirring the mixture for 1.5 to 5 hours to accelerate the formation of product gypsum of 100 to 200 microns in grain size.

(3) separating the reaction mixture discharged from the reaction bath into product gypsum, fine gypsum of less than 100 microns in grain size and remaining liquor, (4) recovering the product gypsum, (5) recycling the fine gypsum as said seed gypsum to said primary reaction bath, (6) introducing the remaining liquor into a secondary reaction vessel installed by the side of said primary reaction vessel, (7) adding a slurry of calcium hydroxide, water and seed crystal to said secondary reaction vessel in such amounts that the pH of the resulting mixture is from 6 to 10 and the concentration of $Fe(OH)_2$ in the mixture is from 10 to 30 g./l., (8) heating the mixture to a temperature of from 50 to 100° C., (9) stirring the mixture for 1 to 3 hours, while blowing air into the reaction bath in order to maintain the atmosphere in said bath as an oxidizing atmosphere,

(10) separating the resulting reaction mixture discharged from said secondary reaction vessel into product gypsum, fine gypsum and iron oxide by means of a separator, and

(11) recovering the product gypsum and iron oxide, while using the fine gypsum as the seed crystal in the secondary reaction bath.

8. A process as in claim 7 in which the fine gypsum obtained from the reaction mixture discharged from the primary reaction vessel is used as seed crystal in the primary and secondary reaction vessels.

9. A process as in claim 7 in which the remaining liquor containing fine gypsum obtained from the reaction mixture discharged from the primary reaction vessel is introduced in the secondary reaction vessel.

References Cited

UNITED STATES PATENTS 3,261,665　7/1966　Rathmell _____ 23—122

EARL C. THOMAS, *Primary Examiner.*